(12) United States Patent
Ward et al.

(10) Patent No.: US 10,812,502 B2
(45) Date of Patent: Oct. 20, 2020

(54) NETWORK DEVICE OWNER IDENTIFICATION AND COMMUNICATION TRIGGERING SYSTEM

(71) Applicant: Bank of America Corporation, Charlotte, NC (US)

(72) Inventors: Julia A. Ward, Charlotte, NC (US); Michael Jacob Richardson, Chicago, IL (US); Mackenzie Smith Durnovich, Charlotte, NC (US); Scott Brow, McKinney, TX (US); Jessica Kay Aleshire, Fort Mill, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 376 days.

(21) Appl. No.: 15/889,944

(22) Filed: Feb. 6, 2018

(65) Prior Publication Data

US 2019/0245871 A1    Aug. 8, 2019

(51) Int. Cl.
*H04L 29/06* (2006.01)

(52) U.S. Cl.
CPC ...... *H04L 63/1416* (2013.01); *H04L 63/1425* (2013.01); *H04L 63/1433* (2013.01); *H04L 63/1441* (2013.01); *H04L 63/083* (2013.01)

(58) Field of Classification Search
CPC ............. H04L 63/1416; H04L 63/1425; H04L 63/1441; H04L 63/1433; H04L 63/083
See application file for complete search history.

(56) References Cited

U.S. PATENT DOCUMENTS

| | | | |
|---|---|---|---|
| 6,711,571 B2 | 3/2004 | Putzolu |
| 7,000,247 B2 | 2/2006 | Banzhof |
| 7,448,066 B2 | 11/2008 | Birk et al. |
| 7,529,981 B2 | 5/2009 | Childress et al. |
| 7,574,740 B1 | 8/2009 | Kennis |
| 7,607,164 B2 | 10/2009 | Vasishth et al. |
| 7,665,119 B2 | 2/2010 | Bezilla et al. |
| 7,668,947 B2 | 2/2010 | Hutchinson et al. |
| 7,698,275 B2 | 4/2010 | O'Brien et al. |
| 7,698,391 B2 | 4/2010 | Paliwal et al. |
| 7,711,683 B1 | 5/2010 | Watanabe et al. |

(Continued)

*Primary Examiner* — Lynn D Feild
*Assistant Examiner* — Abdullah Almamun
(74) *Attorney, Agent, or Firm* — Michael A. Springs; Moore & Van Allen PLLC; Nicholas C. Russell

(57) ABSTRACT

Embodiments of the present invention provide a system for network device owner identification and communication triggering. In particular, the system may monitor a plurality of systems of record associated with network of devices and/or individual network components. A primary user for each of these network components is identified, either through a known association in the systems of record or from analysis of records of network traffic associated with each network component. The primary user is recorded for each network component. In the event a vulnerability of a network component is identified, information about the network vulnerability is identified, aggregated with other information about the network component and potential remediation procedures, and compiled as a vulnerability notification. In response to the vulnerability, the system is automatically triggered to transmit the vulnerability notification to the primary user.

18 Claims, 3 Drawing Sheets

(56) References Cited

U.S. PATENT DOCUMENTS

| | | |
|---|---|---|
| 7,761,920 B2 | 7/2010 | Bezilla et al. |
| 7,774,848 B2 | 8/2010 | D'Mello et al. |
| 7,818,788 B2 | 10/2010 | Meier |
| 7,962,696 B2 | 6/2011 | Steely, Jr. et al. |
| 7,962,960 B2 | 6/2011 | Fudge |
| 7,992,033 B2 | 8/2011 | Childress et al. |
| 8,224,937 B2 | 7/2012 | Childress et al. |
| 8,291,093 B2 | 10/2012 | Choe |
| 8,341,691 B2 | 12/2012 | Bezilla et al. |
| 8,375,113 B2 | 2/2013 | Sinn et al. |
| 8,549,626 B1 | 10/2013 | Glick et al. |
| 8,561,134 B2 | 10/2013 | Bezilla et al. |
| 8,561,175 B2 | 10/2013 | Williams et al. |
| 8,590,047 B2 | 11/2013 | Hoyt et al. |
| 8,613,080 B2 | 12/2013 | Wysopal et al. |
| 8,769,412 B2 | 7/2014 | Gill et al. |
| 8,776,170 B2 | 7/2014 | Bezilla et al. |
| 8,924,577 B2 | 12/2014 | Choe |
| 8,984,586 B2 | 3/2015 | Bezilla et al. |
| 8,984,643 B1 | 3/2015 | Krisher et al. |
| 9,100,431 B2 | 8/2015 | Oliphant et al. |
| 9,154,523 B2 | 10/2015 | Bezilla et al. |
| 9,253,202 B2 | 2/2016 | Thakur |
| 9,270,695 B2 | 2/2016 | Roytman et al. |
| 9,436,820 B1 | 9/2016 | Gleichauf et al. |
| 9,467,464 B2 | 10/2016 | Gula et al. |
| 9,483,281 B2 | 11/2016 | Bonczkowski et al. |
| 9,706,410 B2 | 7/2017 | Sreenivas et al. |
| 9,727,728 B2 | 8/2017 | Avrahami et al. |
| 2005/0044418 A1 | 2/2005 | Miliefsky |
| 2005/0216957 A1 | 9/2005 | Banzhof et al. |
| 2005/0229256 A2 | 10/2005 | Banzhof |
| 2006/0010497 A1 | 1/2006 | O'Brien et al. |
| 2006/0101517 A1 | 5/2006 | Banzhof et al. |
| 2006/0191012 A1 | 8/2006 | Banzhof et al. |
| 2006/0195905 A1 | 8/2006 | Fudge |
| 2010/0130178 A1* | 5/2010 | Bennett .............. H04L 63/30 455/414.1 |
| 2010/0216429 A1* | 8/2010 | Mahajan ........... G06F 21/6245 455/411 |
| 2010/0242114 A1 | 9/2010 | Bunker et al. |
| 2011/0225275 A1* | 9/2011 | Shah .................. G06F 9/44505 709/223 |
| 2012/0046985 A1* | 2/2012 | Richter .............. G06Q 10/06 705/7.14 |
| 2012/0174230 A1 | 7/2012 | Hoyt |
| 2013/0007865 A1* | 1/2013 | Krishnamurthy ....... H04L 63/08 726/7 |
| 2013/0091534 A1 | 4/2013 | Gilde et al. |
| 2014/0331326 A1 | 11/2014 | Thakur |
| 2015/0281287 A1 | 10/2015 | Gill et al. |
| 2015/0288709 A1 | 10/2015 | Singhal et al. |
| 2016/0253364 A1* | 9/2016 | Gomadam ........... G06F 16/353 707/739 |
| 2017/0220808 A1 | 8/2017 | Schmidt et al. |
| 2017/0279799 A1* | 9/2017 | Baltzer ............... H04L 63/0861 |
| 2018/0096260 A1 | 4/2018 | Zimmer et al. |
| 2018/0144139 A1* | 5/2018 | Cheng ................. G06F 21/577 |
| 2019/0087832 A1* | 3/2019 | Mercury ............. G06F 16/2379 |
| 2019/0098028 A1* | 3/2019 | Ektare .................. H04L 43/10 |
| 2019/0166149 A1 | 5/2019 | Gerrick |
| 2019/0245878 A1 | 8/2019 | Ward et al. |
| 2019/0245879 A1 | 8/2019 | Ward et al. |
| 2019/0245880 A1 | 8/2019 | Ward et al. |

* cited by examiner

NETWORK DEVICE OWNER IDENTIFICATION AND COMMUNICATION TRIGGERING SYSTEM

FIELD

The present invention is generally directed to a system for network device or network component owner identification and for triggering communication with this owner.

BACKGROUND

Sizable enterprises use a large number of network components in operations. Ownership or responsibility for these network components change over time, making it difficult for the enterprise to maintain up-to-date and accurate ownership records for each network component. Identifying accurate connections between network components and primary users or owners of those network components, and automatically triggering communications to those primary users or owners is helpful in resolving vulnerabilities associated with the network components in an efficient manner that is not resource intensive.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer products, and methods are described herein for improved monitoring and management of network devices, including determining the vulnerabilities of network devices (e.g., hardware, applications, and/or compliance policy vulnerabilities) and taking consequence actions based on the vulnerabilities (e.g., handling exceptions for the network devices, reporting exceptions, as well as taking suspending, blocking, removal, the network devices, or the like). The present invention provides improved security for an organization by providing improved information collection and control over the network devices of the organization. Additionally, the present invention provides improved efficiency in monitoring and taking actions with respect to network devices of an organization.

Embodiments of the present invention address the above needs and/or achieve other advantages by providing apparatuses (e.g., a system, computer program product and/or other devices) and methods for network component owner identification and communication triggering. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve monitoring a plurality of systems of record associated with a network of devices to identify, from the monitored plurality of systems of record, a primary user of a network component. The system may then record a linkage between the primary user, communication information for the primary user, and the network component in an ownership database. In some embodiments, the system may determine that a vulnerability of the network component is occurring. In response to determining that the vulnerability of the network component is occurring, the system may automatically transmit a notification of the vulnerability to a computing device of the primary user, which may not be the network component.

Identifying the primary user or owner of the network component may comprise determining that the primary user cannot be identified in a primary system of record and determining that the primary user cannot be identified in secondary systems of record. In such embodiments, the system may analyze network traffic to the network component to identify a plurality of users that have accessed the network component during a predetermined period of time. The system may then identify, from the plurality of users, a first user that either (i) most recently accessed the network component or (ii) accessed the network component a greater number of times than any others of the plurality of users. Finally, the system may assign the first user as the primary user of the network component. In some such embodiments, identifying the plurality of users comprises identifying a set of users associated with login credentials that were entered during the predetermined period of time. In other such embodiments, identifying the plurality of users comprises identifying a set of users that own a plurality of separate devices that communicated with the network component during the predetermined period of time.

Identifying the primary user of the network component may additionally or alternatively determine a correlation value between the network component and a user associated with the network component, wherein the correlation value is based on ownership correlation criteria of (i) administrator-type actions taken on the network component, (ii) high frequency of accessing the network component, (iii) high duration of accessing the network component, and (iv) a lack of other users that are associated with the network component.

In some embodiments, the system may further be configured to identify vulnerability information for the vulnerability of the network component comprising at least a vulnerability classification, a remediation deadline, and a lifecycle of the vulnerability, wherein the notification of the vulnerability includes the vulnerability information. In some such embodiments, identifying the vulnerability information for the vulnerability of the network component comprises comparing the vulnerability to a vulnerability database to identify the vulnerability classification, the remediation deadline, and the lifecycle of the vulnerability.

Subsequently, the system may be configured to determine whether a remediation procedure has been initiated. When the remediation procedure has not been initiated, the system may be configured to transmit a second notification to the computing device of the primary user. Alternatively, when the remediation procedure has not been initiated, the system may transmit a request to the computing device of the primary user for confirmation that the remediation procedure will be completed by a remediation deadline.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
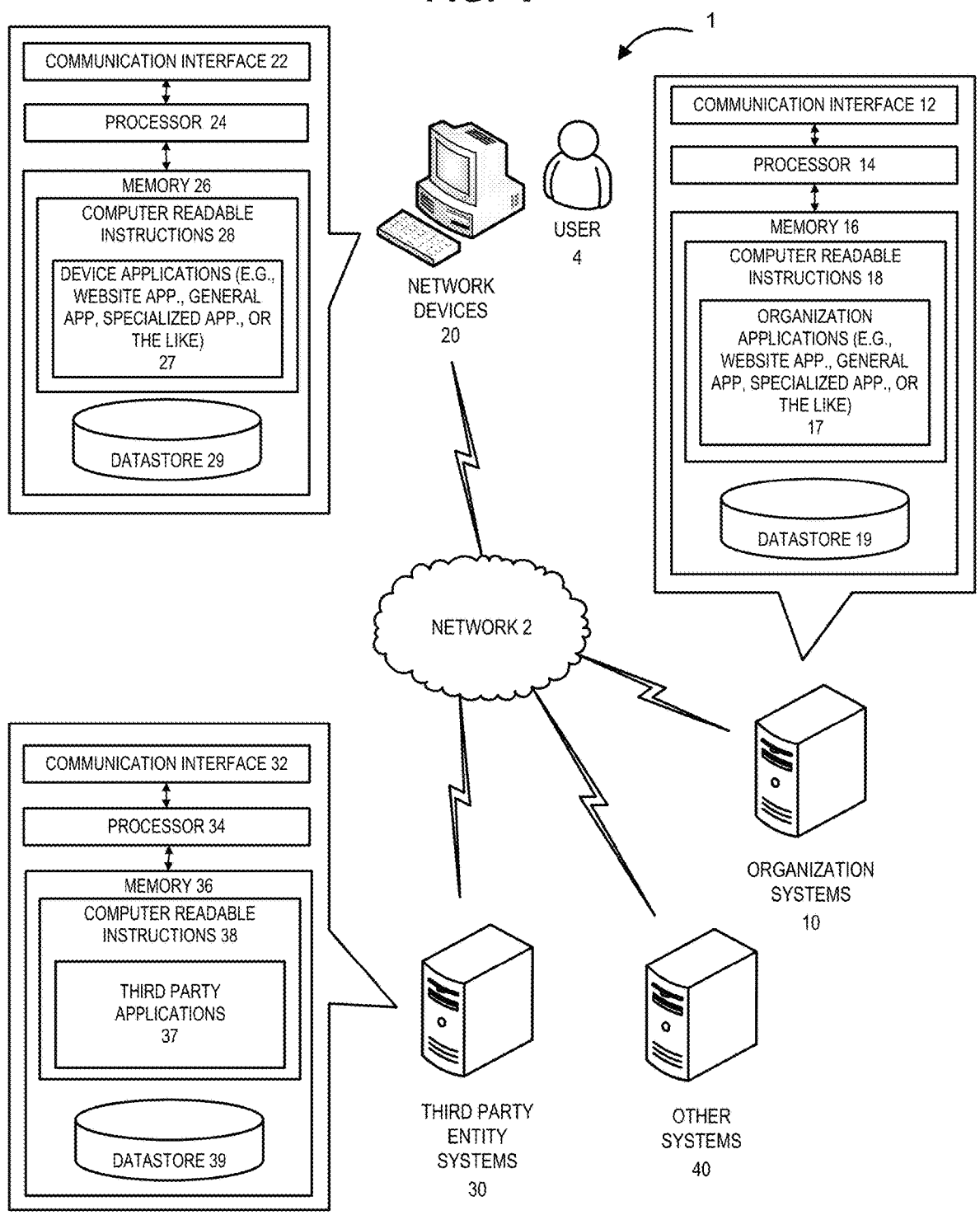
Figure 2:
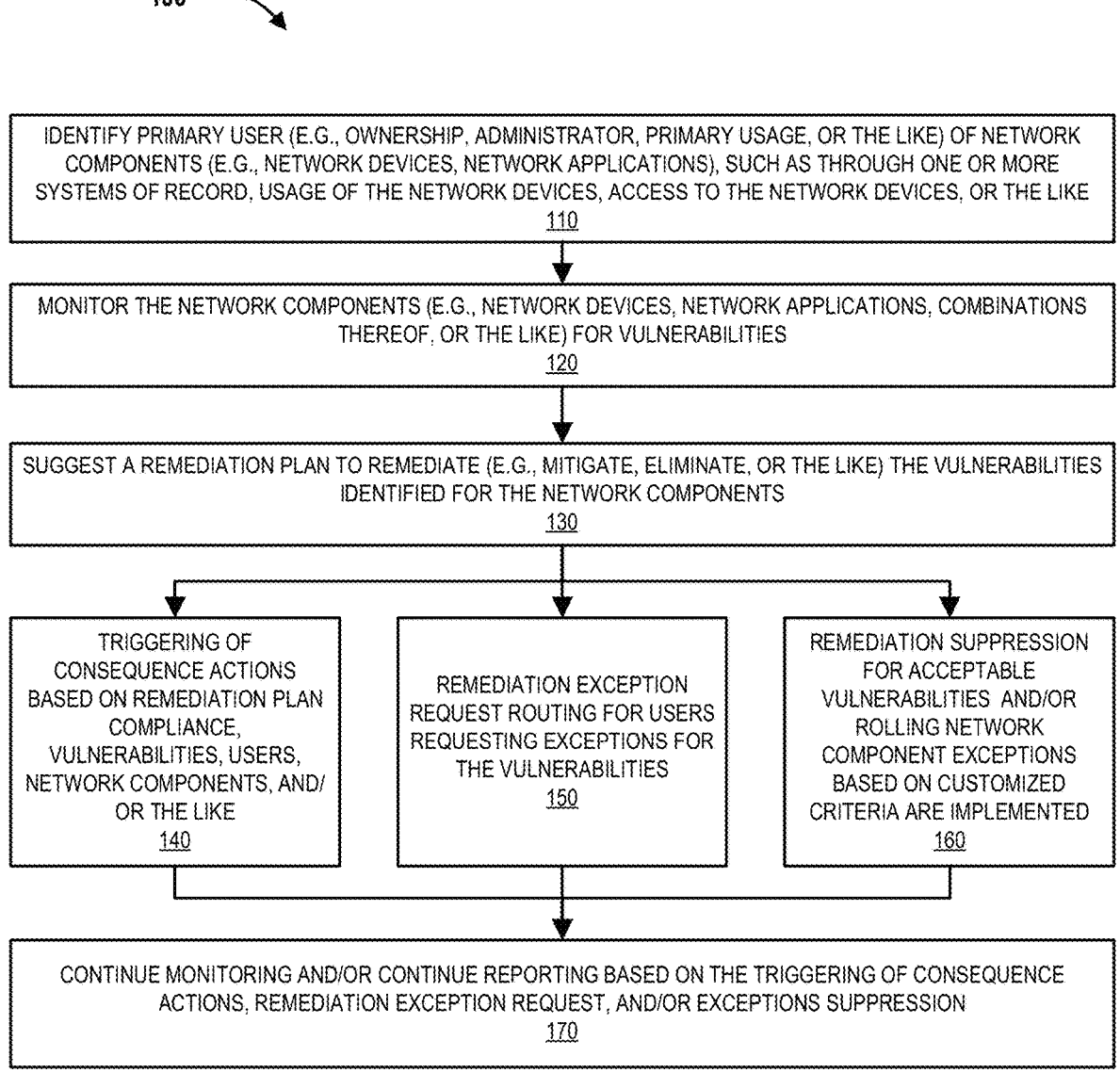
Figure 3:
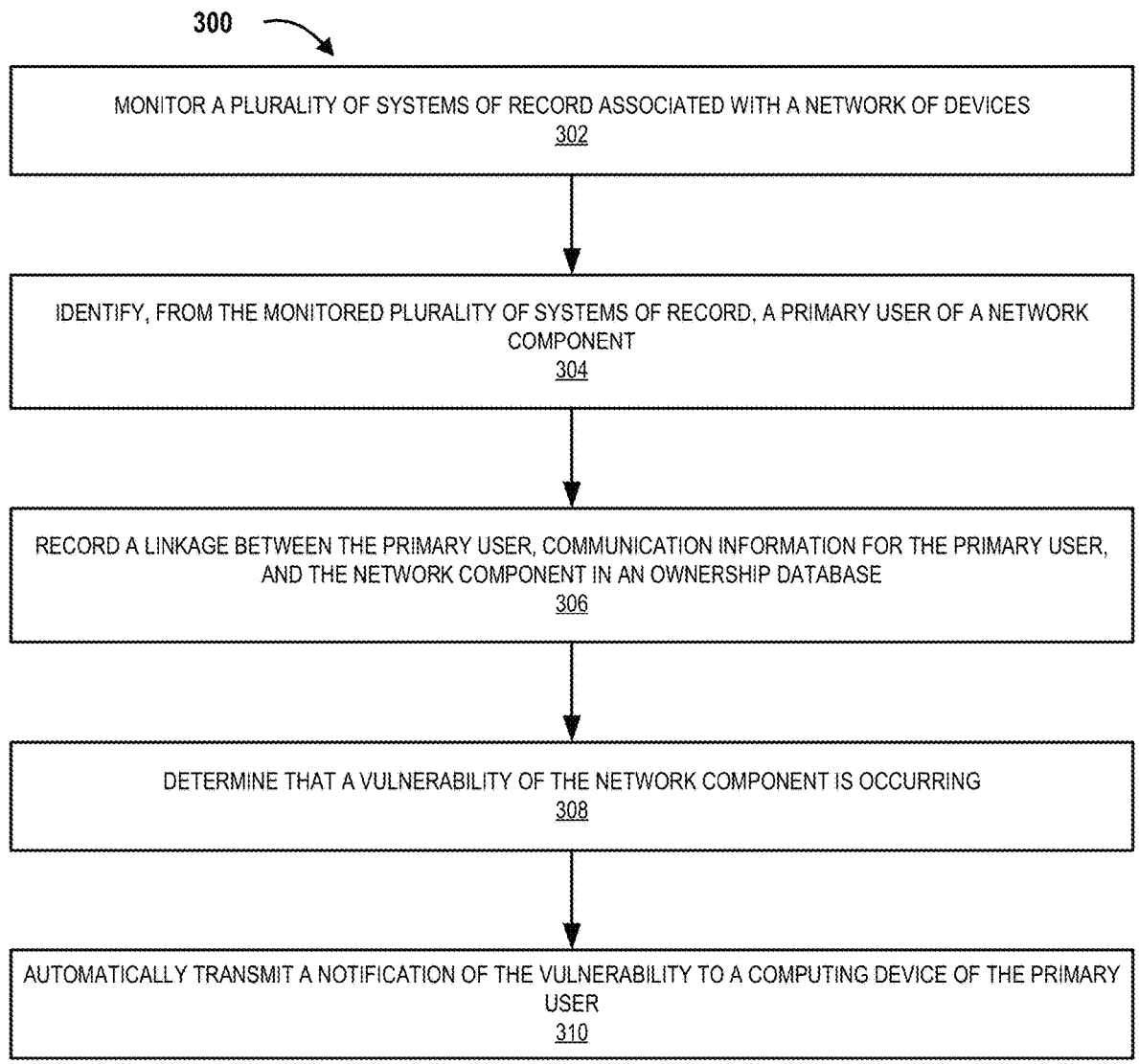

Having thus described embodiments of the invention in general terms, reference will now be made to the accompanying drawings, and wherein:

FIG. 1 illustrates a block diagram of a network device vulnerability system environment, in accordance with one or more embodiments of the invention;

FIG. 2 illustrates a high level process flow for determining and deaccessioning for network device vulnerabilities, in accordance with one or more embodiments of the invention; and FIG. 3 illustrates a process flowchart for network component owner identification and communication triggering, in accordance with one or more embodiment of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed that monitor and manage network devices, including determining the vulnerabilities of network devices (e.g., hardware, applications, and/or compliance policy vulnerabilities) and taking consequence actions based on the vulnerabilities (e.g., handling exceptions for the network devices, reporting exceptions, as well as suspending, blocking, removal, the network devices, or the like). In particular, systems, methods, and computer program products are disclosed for network component owner identification and communication triggering.

In general, a plurality of systems of record (e.g., a primary system of record and one or more secondary systems of record) are monitored to identify a primary user (or owner) for a network component (e.g., a network device or a software element of the network device). If the primary user for the network component cannot be identified from the systems of record alone, network traffic to the network component over a certain period of time can be analyzed to identify a plurality of users that have accessed or otherwise interacted with the network component. From these plurality of users, the primary user may be identified based on the type of access performed, a recentness of the last interaction, a total number of interactions, a frequency of interactions, a total period of time spent interacting, an employment tile of the user, and/or the like.

The primary user is then linked to the network component in an ownership database (and/or the primary system of record. In the event a vulnerability is detected at that network component, information about the vulnerability (e.g., a vulnerability classification, a suggested remediation procedure, a remediation deadline, a lifecycle of the vulnerability, or the like) can be identified and compiled into a message. This message can automatically be transmitted to a computing device of the primary user, allowing the user to address the vulnerability.

FIG. 1 illustrates a network device vulnerability system environment 1, in accordance with embodiments of the invention. As illustrated in FIG. 1, one or more organization systems 10 are operatively coupled, via a network 2, to one or more user network devices 20, one or more third-party systems 30, and/or one or more other systems 40. In this way, a user 4 (e.g., one or more associates, employees, agents, contractors, sub-contractors, third-party representatives, customers, or the like), may be associated with network device hardware and/or applications (e.g., indicated as the primary user, user that is responsible for a specific network device, application, or the like). As such the one or more organization systems 10 may be utilized to monitor the one or more network devices 20 (e.g., the device hardware, applications associated therewith, or the like), the one or more third party systems 30, and/or other systems 40, and thereafter determine or take actions (e.g., consequence actions, exception routing, exception suppression, or the like) for the one or more network devices 20, the one or more third party systems 30, and/or the other systems 40 (or applications thereof), as will be discussed in further detail herein. As such, embodiments of the present invention allow for increased security of the organization's network devices using a more efficient process.

The network 2 illustrated in FIG. 1 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication interfaces 12, one or more processing components 14, and one or more memory 16 components. The one or more processing components 14 are operatively coupled to the one or more communication interfaces 12 and the one or more memory 16 components. As used herein, the term "processing component" generally includes circuitry used for implementing the communication and/or logic functions of a particular system. For example, a processor 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory 16 components.

The one or more processors 14 use the one or more communication interfaces 12 to communicate with the network 2 and other components on the network 2, such as, but not limited to, the components of the one or more network devices 20, the one or more third-party systems 30, or one or more other systems 40. As such, the one or more communication interfaces 12 generally comprise a wireless transceiver, modem, server, electrical connection, electrical circuit, or other component for communicating with other components on the network 2. The one or more communication interfaces 12 may further include an interface that accepts one or more network interface cards, ports for connection of network components, Universal Serial Bus (USB) connectors and the like.

As further illustrated in FIG. 1, the one or more organization systems 10 comprise computer-readable instructions 18 stored in the memory 16 component, which in one embodiment includes the computer-readable instructions 18 of the organization application 17 (e.g., web-based applications, dedicated applications, specialized applications, or the like that are used to monitor, communicate with, and/or take actions with respect to the various network device hardware or software). In some embodiments, the one or more memory 16 components include one or more data stores 19 for storing data related to the one or more organization systems 10, including, but not limited to, data created, accessed, and/or used by the one or more organization applications 17. The one or more organization applications 17 may be applications that are specifically used to monitor the network devices 20, communicate with the network devices 20, and take actions with respect to the network devices 20 (e.g., remediate the exceptions, suppress the exceptions for reporting, and/or suppress and/or remove the network devices and/or applications thereof, as will be described herein).

As illustrated in FIG. 1, the one or more organization systems 10 generally comprise one or more communication interfaces 12, one or more processors 14, and one or more memories 16. The one or more processors 14 are operatively coupled to the one or more communication interfaces 12 and the one or more memories 16. As used herein, the term "processor" generally includes circuitry used for implementing the communication and/or logic functions of a particular system. For example, a processor 14 may include a digital signal processor, a microprocessor, and various analog-to-digital converters, digital-to-analog converters, and other support circuits and/or combinations of the foregoing. Control and signal processing functions of the system are allocated between these processors according to their respective capabilities. The one or more processors 14 may include functionality to operate one or more software programs based on computer-readable instructions 18 thereof, which may be stored in the one or more memories 16.

The one or more processors 14 use the one or more communication interfaces 12 to communicate with the network 2 and other components on the network 2, such as, but not limited to, the one or more network devices 20, the one or more third-party systems 30, or one or more other systems 40. As such, the one or more communication interfaces 12 generally comprise a wireless transceiver, modem, server, electrical connection, electrical circuit, or other component for communicating with other components on the network 2. The one or more communication interfaces 12 may further include an interface that accepts one or more network interface cards, ports for connection of network components, Universal Serial Bus (USB) connectors and the like.

As further illustrated in FIG. 1, the one or more organization systems 10 comprise computer-readable instructions 18 stored in the one or more memories 16, which in one embodiment includes the computer-readable instructions 18 of organization applications 17 (e.g., web-based applications, dedicated applications, specialized applications, or the like that are used to monitor, communicate with, and/or take actions with respect to the various network device hardware or software). In some embodiments, the one or more memories 16 include one or more data stores 19 for storing data related to the one or more organization systems 10, including, but not limited to, data created, accessed, and/or used by the one or more organization applications 17. The one or more organization applications 17 may be applications that are specifically used to monitor the network devices 20 and network applications 27, communicate with the network devices 20 and network applications 27, and take actions with respect to the network devices 20 and network applications 27 (e.g., remediate the vulnerabilities, allow for exceptions when requested, suppress the exceptions for reporting, and/or take consequence actions with respect to the network components, as will be described herein).

As illustrated in FIG. 1, users 4 may be associated with one or more of the network components (e.g., network devices 20, network applications 27, or the like). In some cases the users 4 may be the primary user associated with one or more network components, may be the user responsible for the one or more network components, or the like. Alternatively, in some cases the one or more network components may include user computer systems that allow the users 4 to communicate with and/or through the one or more organization systems 10. That is, in some cases, the users 4 may utilize the user computer systems to monitor the one or more network components (e.g., network devices 20, network applications 27, or the like) and/or take actions with respect to the one or more network components (e.g., network devices 20, network applications 27). Additionally, the user computer systems may also be considered one of the network components. As such, it should be understood that the one or more network components may be any type of device, such as a desktop, mobile device (e.g., laptop, smartphone device, PDA, tablet, watch, wearable device, or other mobile device), server, or any other type of system hardware that generally comprises one or more communication interfaces 22, one or more processors 24, and one or more memories 26, and/or applications used by any of the foregoing, such as web browsers applications, dedicated application, specialized applications, or parts thereof.

The one or more processors 24 are operatively coupled to the one or more communication interfaces 22, and the one or more memories 26. The one or more processors 24 use the one or more communication interfaces 22 to communicate with the network 2 and other components on the network 2, such as, but not limited to, the one or more organization systems 10, the one or more third-party systems 30, and/or the one or more other systems 40. As such, the one or more communication interfaces 22 generally comprise a wireless transceiver, modem, server, electrical connection, or other component for communicating with other components on the network 2. The one or more communication interfaces 22 may further include an interface that accepts one or more network interface cards, ports for connection of network components, Universal Serial Bus (USB) connectors and the like. Moreover, the one or more communication interfaces 22 may include a keypad, keyboard, touch-screen, touchpad, microphone, speaker, mouse, joystick, other pointer, button, soft key, and/or other input/output(s) for communicating with the users 4.

As illustrated in FIG. 1, the one or more network devices 20 may have computer-readable instructions 28 stored in the one or more memories 26, which in one embodiment includes the computer-readable instructions 28 for network device applications 27, such as dedicated applications (e.g., apps, applet, or the like), portions of dedicated applications, a web browser or other applications that allow the one or more network devices 20 to operate, that allow users 4 to take various actions using the network devices 20, or the like. For example, the users 4 may take actions with respect to one or more network devices 20, and/or may allow the users 4 to access applications located on other systems, or the like. In some embodiments, the users 4 utilize the one or more network devices 20 in the users daily operations and/or the users 4 may utilize the one or more network devices 20 (e.g., user computer systems) to interact with the organization systems 10, other one or more network devices 20 (or applications 27 thereof), the one or more third-party systems 30, and/or the one or more other systems 40.

As illustrated in FIG. 1, the one or more third-party systems 30 may communicate with the one or more organization systems 10 and/or the one or more network devices 20 directly or indirectly (e.g., through the organization). The one or more third party systems 30, and/or third-party applications thereof, may provide services for the one or more network devices 20 and/or the one or more organization systems 10. As such, the one or more third-party systems 30 are operatively coupled, via a network 2, to the one or more organization systems 10, the one or more network devices 20, and/or the other systems 40. The one or more third-party systems 30 generally comprise one or more communication interfaces 32, one or more processors 34, and one or more memories 36.

The one or more processors 34 are operatively coupled to the one or more communication interfaces 32, and the one or more memories 36. The one or more processors 34 use the one or more communication interfaces 32 to communicate with the network 2 and other components on the network 2, such as, but not limited to, the one or more organization systems 10, the one or more network devices 20, and/or the one or more other systems 40. As such, the one or more communication interfaces 32 generally comprise a wireless transceiver, modem, server, electrical connection, or other component for communicating with other components on the network 2. The one or more communication interfaces 32 may further include an interface that accepts one or more network interface cards, ports for connection of network components, Universal Serial Bus (USB) connectors and the like.

As illustrated in FIG. 1, the one or more third-party systems 30 may have computer-readable instructions 38 stored in the one or more memories 36, which in some embodiments includes the computer-readable instructions 38 of one or more third party applications 37 that provide services to the one or more network devices 20 and/or the one or more organization systems 10. The access to the one or more third-party systems 30, or applications thereof, may be controlled by the one or more organization systems 10 and/or the one or more network devices 20, as will be described herein.

Moreover, as illustrated in FIG. 1, the one or more other systems 40 may be operatively coupled to the one or more organization systems 10, the one or more network devices 20, and/or the one or more third-party systems 30, through the network 2. The other like systems have features that are the same as or similar to the features described with respect to the one or more organization systems 10, the one or more network devices 20, and/or the one or more third-party systems 30 (e.g., one or more communication interfaces, one or more processors, and one or more memories with computer-readable instructions of one or more applications, one or more datastores, or the like). Thus, the one or more other systems 40 communicate with the one or more organization systems 10, the one or more network devices 20, the one or more third-party systems 30, and/or each other in same or similar way as previously described with respect to the organization systems 10, the network devices 20, and/or the third-party systems 30.

FIG. 2 illustrates a high level process flow for monitoring network components (e.g., network devices 20, network applications 27, combinations thereof, or the like), and suggesting remediation plans, identifying triggering for consequence actions for the network components, allowing for remediation exceptions, remediation suppression, and/or the like in response to identifying vulnerabilities with the network components. As illustrated in block 110 of FIG. 2, the primary user (e.g., owner assigned to the network component, administer, primary usage of the network components, and/or the like) of the network components may first be determined (e.g., identified from one or more systems of record, assigned based on the network component usage, assigned based on network component access, and/or the like). As will be described in further detail herein, the primary user may be determined by accessing one or more systems of record that store primary user details for the network components (e.g., network devices 20, network applications, or the like). It should be understood that if two or more systems of record conflict with each other, or do not include network component information regarding a primary user, the present invention may assign ownership to a user 4 based on the users 4 that access the network components, use the network components, network traffic for the network components, or otherwise users 4 that can be tied to the network elements through electronic data. It should be understood that the identification of the primary user 4 is described in further detail with respect to FIG. 3.

Block 120 of FIG. 2 illustrates that the network components are monitored for vulnerabilities. It should be understood that vulnerabilities of network components may be any type of vulnerabilities, such as but not limited to, data security breaches, unauthorized access, data that has been copied, elements that do not utilize passwords, elements that do not utilize additional authentication factors, devices that include eavesdropping, malware, spyware, ransomware, Trojan horses, viruses, worms, rootkits, bootkits, keylogger, screen scrapers, backdoors, logic bombs, payloads, denial of services software, elements do not have up-to-date software, allows downloading of data onto external drives, do not utilize screen locks, timed locks, or other electronic locking, systems that do not scan incoming or outgoing data, does not comply with physical security (e.g., is not properly stored, has been removed without authorization), does not have location determination activated, have applications downloaded without authorization, interacts with restricted hardware or software, accessed unsecure websites (e.g., that do not use encryption, or do not use https URLs). It should be understood that the vulnerabilities may be universal vulnerabilities that are general to all organizations, and/or may be specific to the organization (e.g., specific policy vulnerabilities for the organization as a whole or for a specific subset of the organization, such as a line of business, group, or the like). As such, the vulnerabilities may be general outside vulnerabilities to the network components, or specific policies of the organization that a network component and/or user 4 thereof may be violating. It should be understood that the vulnerabilities being monitored may be set by the organization and/or may be set by the third-party providing the network components (e.g., providing the network devices 20 and/or applications thereof). As will be discussed in further detail herein, the network components may be monitored automatically by the organization systems 10 and/or user computer systems in order to determine any vulnerabilities. The monitoring of the network components will be discussed in further detail herein with respect to FIG. 3.

Block 130 of FIG. 2 illustrates that each of the vulnerabilities may have an associated remediation plan (e.g., a predetermined remediation plan, a plan developed based on the vulnerability, or the like). The proposed remediation plan may be suggested automatically based on the network elements, the user 4 associated with the network elements, the vulnerabilities, and/or the like, as will be discussed in further detail herein. The remediation plan suggested may include a notification to the primary user (e.g., owner, or the like) of the network component to remediate (e.g., mitigate, remove, reduce, or the like) the vulnerability identified. The remediation plan may also include process steps (e.g., a procedure for remediating the vulnerability), updates (e.g., software updates), links thereto, or the like that can be used by the user 4 (e.g., owner of the network component) to remediate the vulnerability. The notification may include a deadline for implementing the remediation. The suggestion of the remediation plan will be discussed in further detail herein with respect to U.S. patent application Ser. No. 15/889,797 entitled "Vulnerability Consequence Triggering System for Application Freeze and Removal" and filed concurrently herewith.

Block 140 of FIG. 2 further illustrates that a trigger may occur if the remediation plan of the network component is not followed. As such, there may be a triggering of a consequence action for the network component. In some embodiments, the network components (e.g., network device, network application, combination thereof) may be frozen, blocked, or otherwise restricted after a vulnerability is identified and/or if the user 4 does not implement the suggested remediation plan before a particular remediation deadline. That is, a user 4 (e.g., an owner, or other user 4 using the network components) may be prevented from using the network components (e.g., the network device, network application, application accessed through the network device, or the like) until the vulnerability is remediated. As will be discussed in further detail later, in some embodiments of the invention, if the remediation is not implemented, for example, before a particular remediation deadline, the network components may be removed (e.g., disconnected from the network, blocked, uninstalled, deactivated, or the like) as will be discussed in further detail herein.

Block 150 illustrates that in some embodiments, the user 4 may request a remediation exception, or an approval for resolving the vulnerability at a point in time after an original remediation timeframe. That is, the user 4 may request an exception to allow for the continuance of the identified vulnerability (e.g., unfreeze the network component and/or prevent removal of the network component even if the user 4 does not implement the remediation plan). For example, if the network component violates the organization policy, but is needed for a specific reason, the user 4 may request continued use of the network component with the vulnerability without implementing the remediation plan. It should be understood that the remediation exception request routing is described in further detail with respect to U.S. patent application Ser. No. 15/889,949 entitled "Exception Remediation Logic Routing and Suppression Platform" filed concurrently herewith, which is incorporated by reference in its entirety herein.

Block 160 of FIG. 2 illustrates that in some embodiments, in response to the remediation exception, reporting of the associated vulnerability for the network component may be suppressed in order to prevent the implementation of the remediation plan and/or consequence actions for the vulnerability. Suppression of the reporting, the remediation plan, and/or the consequence actions may occur when the user 4 requests an exception and it is granted, when a remediation suppression is automatically granted based on organization policy, or the like. As such, reporting of the vulnerability may be prevented in order to prevent false notifications of the vulnerabilities (e.g., prevent unneeded reporting of the vulnerability if the vulnerability has been allowed). It should be understood that while the reporting of the vulnerabilities may be suppressed, the remediation suppressions, vulnerabilities, users 4, and/or network components may still be monitored to make sure changes have not occurred that will change the suppression of the vulnerabilities, the remediation plan, and/or the consequence actions. For example, the organization policies may be monitored in order to make sure policy changes do not occur that would result in the removal of the remediation suppression (e.g., the remediation suppression is no longer valid and is rescinded). It should be understood that the remediation suppression for acceptable vulnerabilities is described in further detail herein with respect to U.S. patent application Ser. No. 15/889,789 entitled "Exception Remediation Acceptable Use Logic Platform" filed concurrently herewith, which is incorporated by reference in its entirety herein.

Additionally, or alternatively with respect to block 160, the present disclosure indicates that instead of or in addition to remediation suppression, customized criteria may be created and used to identify rolling network component exceptions that automatically prevent remediation of vulnerabilities for particular network components before the vulnerabilities are identified and remediation begins. It should be understood that the rolling network component exceptions are described in further detail with respect to U.S. patent application Ser. No. 15/889,799 entitled "Exception Remediation Logic Rolling Platform" filed concurrently herewith, which is incorporated by reference in its entirety herein.

FIG. 2 further illustrates in block 170 that monitoring and/or reporting of the triggering, remediation exception requests, and/or rolling exceptions or suppression for the vulnerabilities of the network components are continued until the network components are removed and/or the rolling exceptions or suppression are rescinded (e.g., no longer exceptions or suppression is no longer required due to remediation of the vulnerability, change in organization policies, or the like).

Referring now to FIG. 3, a flowchart is provided to illustrate one embodiment of a process 300 for network component owner identification and communication triggering, in accordance with embodiments of the invention. In some embodiments, the process 300 may include block 302, where the system monitors a plurality of systems of record associated with a network of devices. Each system of record may be a source system of record, a database, a grouping of databases, a database management system, or any other information storage system configured to record or otherwise store one or more primary users or owners with each known network component within the system of devices. The system may be configured to access each system of record for monitoring purposes. Alternatively, the system may establish data feeds from each system of record and/or each network component, such that the data that is being monitored is transmitted directly to the system (e.g., in real time or periodically).

As used herein, a "network component" refers to any element within a network or other system of connected devices, where that element that can be associated with a primary user or owner. As such, a network device (e.g., a server, a workstation, a computing device, a database, or the like) may be considered a network component. Additionally or alternatively, an operating system, software, virtual workstation, or other software-based element that is stored within a network device may be referred to as a network component.

In some embodiments, the system may be associated with a primary system of record that should include the most up-to-date representation of ownership or association between each network component and one or more primary users. However, particularly with large entities, a primary system of record is difficult to maintain and is slow to respond to (or identify) changes in ownership in network components across the enterprise. Therefore, the system may additionally monitor secondary or alternate systems of record. Each of these secondary systems of record may be managed or maintained by a particular business group within the enterprise and therefore may provide a relatively accurate representation of ownership for network components associated with that business group. Each secondary system of record may, in some embodiments, include or specialize or in particular types of network components. For example, there may be one or more secondary systems of record that comprise a listing of all known servers in the enterprise (or all servers that are used by a particular business group or geographic region). This specific type of system of record may be associated with a higher correlation value than general or outdated secondary systems of record.

In some embodiments, the process 300 includes block 304, where the system identifies, from the plurality of systems of record, a primary user of a network component. The system may continually trawl the systems of record for network components that do not have a known primary user. For example, the system may determine that a first network component is not associated with any users that may be a primary user and subsequently identify the primary user through means other than identifying the plurality of systems of record. Additionally or alternatively, the system may determine that a second network component is associated with a user that no longer is associated with the enterprise and therefore could not be the current primary user. In other embodiments, the system may receive a request from a specialist for ownership information associated with a particular network component, and the system then identifies the primary user for that particular network component.

Identifying the primary user of a network component may comprise checking several systems of record that are stored within the enterprise and/or remote third party systems that are accessible through the network. For example, the system may check a primary system of record of the enterprise to determine whether a user has been linked to the network component as its primary user. Again, the primary system of record may comprise a database or other data repository that is established, configured, and maintained to provide a database of network components (e.g., network devices and/or the operating systems, applications, and the like that are stored on each network device) and the owner(s) or other primary user(s) of each network component.

If the primary system of record does not list a primary user for the network component, the system may check one or more secondary systems of record to determine whether any of those secondary systems of record link a user with the network component as a primary user. Again, these secondary systems of record may be any system of record for a business group, enterprise group, human resource center, a third party (e.g., a system of record belonging to an auditing entity, a consulting entity, a data security entity, or the like), or any other system of record that is not designated as the primary system of record. As these secondary systems of record may not be fully vetted systems of record for network component ownership purposes, the system may determine or assign confidence scores, correlation values, or the like to each secondary system of record. As such, the system can determine its level of confidence in a user paired with the network component in a single system of record. Additionally, the system can adjust or aggregate confidence scores if a single user is paired with the network component in more than one system of record. In this way, the system can assign a user as the primary user if that user is paired with the network component in two secondary systems of record, even when the linkage in each secondary system of record would not, on its own, be given a confidence score above a requisite threshold value.

If the system is not able to identify a primary user from the primary system of record or any of the secondary systems of record, then the system will need to identify the primary user through other means. One technique for this is to analyze network traffic to or from the network component to identify a plurality of users (or computing devices associated with the plurality of users) that have accessed, used, communicated with, or otherwise interacted with the network component over a previous predetermined period of time (e.g., the past year, the past three months, the past decade, the past hour, the lifetime of the network component, or the like).

Once the plurality of users that have accessed the network component over the previous period of time have been identified, information about each individual user from the plurality of users can be ascertained. For example, the system may list or rank the plurality of users based on a last instance of interaction with the network component. In this way, the system can sort users based on when their most recent interaction with the network component was, which may be indicative of ownership of the network component.

Additionally or alternatively, the system may rank the plurality of users based on a total number of interactions that each user has had with the network component over the predetermined period of time. In this way, the system can sort users based on how often they interacted with the network component in the past, which may be indicative of ownership of the network component.

When the information about each individual user has been identified or derived, the system may identify, calculate, assign, or otherwise link a first user from the plurality of users as the primary user or owner associated with the network component based on that information. For example, the first user may be the user that most recently accessed the network component and/or the user that accessed the network component the greatest number of times out of the plurality of users. In another example, the primary user or owner may be identified based on a weighted average of the user information.

Of course, other information about the plurality of users that have interacted with the network component in the past may be identified or determined. For example, the system may identify the type(s) of actions each user was performing with respect to the network component. A user that takes an administrator-type action like installing software, installing an operating system, taking the network component off-line or bringing the network component on-line, or the like, can be identified as likely being a primary user or owner of the network component.

Similarly, the system may determine, for each user, information about a duration of interactions with the network component. The system can then identify which users have spent the most time interacting with the network component and possibly identify one of those users as the primary user (e.g., the user that spent the most time interacting with the network component).

Furthermore, the system may identify a position within the overall enterprise (e.g., employment position, job title, field of employment, level of employment, or the like) that is associated with each of the plurality of users. The system can then identify a most senior user as the primary user or owner of the network component. In other embodiments, the system can assign a value to the user's position and enter that value into a calculation that uses one or more of the other user information related to the network component to identify the primary user.

Finally, the system can take into account how many users actually interacted with the network component in the past, such that a lower-level user that accesses the network component with a high frequency may be identified as the primary user even if one other user with a higher position in the enterprise has interacted with the network component, but that other user did not access the network component frequently.

Again, the system may use one, two, or any number of these types of user information to identify a primary user that is associated with the network component. Furthermore, the system may identify more than one primary user, one primary user for each of a number of time periods or shifts. For example, when the network component is a workstation that can be used at all hours, the system may identify a common employment shift scheme, identify the time periods associated with each shift, and identify a primary user for each shift, based on the network traffic associated with the network component during each shift time period.

In embodiments where multiple users are linked as owners to the network component (e.g., through time shifts, through multiple users regularly interacting with the network component, or the like), the system can utilize its confidence ratings or correlation values for each connection of a user and the network component to identify a primary user and/or to determine a hierarchy of ownership or chain of command among the several owners.

Of course, in many embodiments, the users interacting with the network component (e.g., as identified through an analysis of network traffic to or from the network component) are really interacting through one or more computing devices that are not the network component. Therefore, when it is described herein that a user has interacted with the network component, this interaction may actually be identified as an interaction from a particular computing device, and then that particular computing device is analyzed (e.g., by comparing it to a primary system of record or by identifying a user that had logged into the computing device when it interacted with the network component) to identify the owner or primary user associated with that particular computing, which is the aforementioned user.

In some embodiments, the system may identify at least some of the plurality of users that are associated with the network component by checking login credentials that were entered during the predetermined period of time to identify associated users. For example, the system may determine a primary user for a workstation by analyzing historical data for log-in credentials that are entered into the workstation and/or an amount of time that each log-in credential is used. The system may then identify a primary log-in credential for the workstation and compare that log-in credential to a user database to identify one or more users associated with the primary log-in credential. These identified one or more other users can then be assigned as the primary user(s) for the workstation.

Furthermore, the system may, in some embodiments, determine a primary user or owner of a network device based on ownership of one or more applications stored in the network device. For example, a first network device may not have a primary owner of record stored in the primary system of record, but a primary user of a first application stored in the first network device does have a primary user listed in the primary system of record. In such cases, the system can assign this primary user of the application as the primary user of the entire network device as well. In embodiments where multiple applications with multiple owners are identified for a single network device, the system may compare each application to identify an application ranking, similar to a vulnerability ranking based on severity or importance of the application, which is associated with each application. The system can then identify a highest-ranked application ranking and identify the owner of that application as the primary user or owner of the overall network device.

When identifying the primary user of the network component, the system may additionally identify one or more pieces of communication information for the primary user like email addresses, physical addresses, phone numbers, messaging usernames, fax numbers, and the like.

Additionally, in some embodiments, the process 300 includes block 306, where the system records a linkage between the primary user, the communication information for the primary user, and the network component in an ownership database. In some embodiments, this ownership database is a separate or otherwise distinct database from the primary or secondary systems of record. In other embodiments, the ownership database is the primary system of record, where the system updates the primary system of record based on the determination of the appropriate primary user or owner. In embodiments where the system must identify a primary user that is not already recorded in the primary system of record, the system will record that linkage between the network component and the primary user in the primary system of record.

The process 300 may also include block 308, where the system determines that a vulnerability of the network component is occurring. As noted above, a vulnerability of the network component may be any type of vulnerability including, but not limited to, data security breaches, unauthorized access, elements within the network component that do not utilize additional authentication factors, denial of services software, elements of the network components that do not have up-to-date software, components that do not comply with physical security standards of the enterprise, components that do not comply with regulatory or legal standards, and the like. The determination that a vulnerability is occurring may be made by the system itself, through a monitoring process of the network component. In other embodiments, the network component may self-report its vulnerability to the system in response to a security or vulnerability software application associated with the network component identifying the vulnerability. A user, official, manager, or other individual may also report the vulnerability to the system.

When identifying the vulnerability of the network component, the system may additionally identify vulnerability information for the network component. This vulnerability information may include, for example, a vulnerability classification, a duration of time of the vulnerability, a remediation deadline, a lifecycle of the vulnerability, or the like. In some embodiments, the system may have access to a vulnerability database that provides at least some of the vulnerability information. For example, a vulnerability database generated, populated, and maintained by a managing entity may store classifications for each type of known vulnerability, expected or recommended remediation procedures for addressing each type of vulnerability, timeline information for each such remediation procedure, or the like. Additionally or alternatively, the system may identify or receive vulnerability information that includes, but is not limited to, a date and time that the vulnerability was identified, a date and time that the vulnerability began, one or more remediation procedure steps that have already been implemented, a remediation procedure that has already been agreed upon or otherwise begun, and the like.

As used herein, a "vulnerability classification" refers to a rating, category, value, severity, impactful-ness, or other indicator of the gravity of an identified vulnerability, as it pertains to the network component, a business group associated with the network component, and/or the enterprise as a whole. In some embodiments, the vulnerability classification is determined or identified based in part on the other ongoing vulnerabilities, such that the vulnerability classification provides a priority ranking of this vulnerability as compared to the other vulnerabilities. In this way, the vulnerability classification enables the system, the primary user, and/or a specialist with information about the urgency for implementing a remediation procedure, the vulnerabilities that should be addressed first, and the like.

A remediation procedure may comprise one or more steps that can be implemented to resolve or otherwise mitigate the vulnerability associated with the network component. The remediation procedure may include one or more deadlines, timelines, lifecycles, or other time-based information for one or more steps of the remediation procedure and/or the overall remediation procedure. As such, the system can monitor whether the remediation procedure is on track to be completed by a final remediation deadline.

Finally, the process 300 may continue to block 310, where the system automatically triggers a transmittal of a notification of the vulnerability to a computing device of the primary user in response to determining that the vulnerability of the network component is occurring. At this point, the system has identified a vulnerability for a network component, a priority user or owner of the network component (and therefore an individual that can be responsible for addressing the vulnerability), communication information for the primary user or owner of the network component, information about the vulnerability, and a vulnerability classification. All of this vulnerability data can be aggregated or otherwise compiled into a message, report, or other communication in a manner that is easily readable and identifiable by the user. This message or any other requirement of accountability can then be communicated as the notification of the vulnerability to a computing device of the primary user, where the computing device of the primary user may, in some embodiments, not be the network component.

In embodiments where vulnerability information (e.g., vulnerability classification, remediation deadline, lifecycle of vulnerability, and the like) has been identified by the system, this vulnerability information can be included in the notification of the vulnerability, so the primary user is able to promptly receive and understand the vulnerability, how it affects the network component, and/or how it affects other network components or the enterprise as a whole.

Additionally or alternatively, the system may provide a recommended remediation procedure in the notification of the vulnerability for the network component. For example, the system may compare the vulnerability type and/or vulnerability classification to a vulnerability remediation database that stores remediation procedures that are associated with each known vulnerability type and/or vulnerability classification. From this comparison, the system may identify a recommended remediation procedure that can be implemented. The remediation procedure may comprise a set of remediation procedure steps that can be executed by the primary user and/or executed by other users or systems at the direction of the primary user to resolve or otherwise mitigate the vulnerability of the network component.

Once the notification of the vulnerability has been transmitted to the computing device of the primary user or owner of the network component, the system may continue to monitor the network component or remediation procedures related to the vulnerability of the network component. The system may determine whether a remediation procedure has been initiated to address the vulnerability. When the system determines that a remediation procedure has been initiated, the system may transmit a request to the computing device of the primary user for a confirmation that the remediation procedure will be completed by the remediation deadline. When the system determines that the remediation procedure has not been initiated, the system may transmit a second notification to the computing device of the primary user, possibly including instructions for initiating the remediation procedure, asking questions about ownership of the network component, providing options for initiating a known remediation procedure, or the like.

It should be understood, that the systems described herein may be configured to establish a communication link (e.g., electronic link, or the like) with each other in order to accomplish the steps of the processes described herein. The link may be an internal link within the same entity (e.g., within the same financial institution) or a link with the other entity systems. In some embodiments, the one or more systems may be configured for selectively responding to dynamic authentication inquires. These feeds of resource usage and availability may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that a systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously receiving real-time data feeds from the various systems, the systems may be configured to update actions associated with the systems, as described herein.

Moreover, it should be understood that the process flows described herein include transforming the data from the different systems (e.g., internally or externally) from the data format of the various systems to a data format associated with a particular display. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| Docket Number | U.S. patent application Ser. No. | Title | Filed On |
|---|---|---|---|
| 8179US1.014033.3152 | 15/889,789, now U.S. Publication No. 2019/0245878 | EXCEPTION REMEDIATION ACCEPTABLE USE LOGIC PLATFORM | Filed Concurrently Herewith |
| 8180US1.014033.3153 | 15/889,797, now U.S. Publication No. 2019/0245879 | VULNERABILITY CONSEQUENCE TRIGGERING SYSTEM FOR APPLICATION FREEZE AND | Filed Concurrently Herewith |

-continued

| Docket Number | U.S. patent application Ser. No. | Title | Filed On |
|---|---|---|---|
| 8184US1.014033.3156 | 15/889,949, now U.S. Publication No. 2019/0245881 | REMOVAL EXCEPTION REMEDIATION LOGIC ROUTING AND SUPPRESSION PLATFORM | Filed Concurrently Herewith |
| 8272US1.014033.3177 | 15/889,799, now U.S. Publication No. 2019/0245880 | EXCEPTION REMEDIATION LOGIC ROLLING PLATFORM | Filed Concurrently Herewith |

What is claimed is:

1. A system for network component owner identification and communication triggering, the system comprising:
a memory device; and
one or more processing devices operatively coupled to the memory device, wherein the one or more processing devices are configured to execute computer-readable program code to:
monitor a plurality of systems of record associated with a network of devices;
identify, from the monitored plurality of systems of record, a primary user of a network component, wherein identifying the primary user of the network component comprises determining a correlation value between the network component and a user associated with the network component, wherein the correlation value is based on ownership correlation criteria of (i) administrator-type actions taken on the network component, (ii) high frequency of accessing the network component, (iii) high duration of accessing the network component, and (iv) a lack of other users that are associated with the network component;
record a linkage between the primary user, communication information for the primary user, and the network component in an ownership database;
determine that a vulnerability of the network component is occurring; and
in response to determining that the vulnerability of the network component is occurring, automatically transmit a notification of the vulnerability to a computing device of the primary user.

2. The system of claim 1, wherein identifying the primary user of the network component comprises:
determining that the primary user cannot be identified in a primary system of record;
determining that the primary user cannot be identified in secondary systems of record;
analyzing network traffic to the network component to identify a plurality of users that have accessed the network component during a predetermined period of time;
identifying, from the plurality of users, a first user that either (i) most recently accessed the network component or (ii) accessed the network component a greater number of times than any others of the plurality of users; and
assigning the first user as the primary user of the network component.

3. The system of claim 2, wherein identifying the plurality of users comprises identifying a set of users associated with login credentials that were entered during the predetermined period of time.

4. The system of claim 2, wherein identifying the plurality of users comprises identifying a set of users that own a plurality of separate devices that communicated with the network component during the predetermined period of time.

5. The system of claim 1, wherein the one or more processing devices are further configured to execute computer-readable program code to:
identify vulnerability information for the vulnerability of the network component comprising at least a vulnerability classification, a remediation deadline, and a lifecycle of the vulnerability,
wherein the notification of the vulnerability includes the vulnerability information.

6. The system of claim 5, wherein identifying the vulnerability information for the vulnerability of the network component comprises comparing the vulnerability to a vulnerability database to identify the vulnerability classification, the remediation deadline, and the lifecycle of the vulnerability.

7. The system of claim 1, wherein the one or more processing devices are further configured to execute computer-readable program code to:
determine whether a remediation procedure has been initiated; and
when the remediation procedure has not been initiated, transmit a second notification to the computing device of the primary user; or
when the remediation procedure has not been initiated, transmit a request to the computing device of the primary user for confirmation that the remediation procedure will be completed by a remediation deadline.

8. The system of claim 1, wherein the computing device of the primary user is not the network component.

9. A computer program product for network component owner identification and communication triggering, the computer program product comprising at least one non-transitory computer readable medium comprising computer readable instructions, the instructions comprising instructions for:
monitoring a plurality of systems of record associated with a network of devices;
identifying, from the monitored plurality of systems of record, a primary user of a network component, wherein identifying the primary user of the network component comprises determining a correlation value between the network component and a user associated with the network component, wherein the correlation value is based on ownership correlation criteria of (i) administrator-type actions taken on the network component, (ii) high frequency of accessing the network component, (iii) high duration of accessing the network component, and (iv) a lack of other users that are associated with the network component;
recording a linkage between the primary user, communication information for the primary user, and the network component in an ownership database;
determining that a vulnerability of the network component is occurring; and
in response to determining that the vulnerability of the network component is occurring, automatically transmitting a notification of the vulnerability to a computing device of the primary user.

10. The computer program product of claim 9, wherein identifying the primary user of the network component comprises:
- determining that the primary user cannot be identified in a primary system of record;
- determining that the primary user cannot be identified in secondary systems of record;
- analyzing network traffic to the network component to identify a plurality of users that have accessed the network component during a predetermined period of time;
- identifying, from the plurality of users, a first user that either (i) most recently accessed the network component or (ii) accessed the network component a greater number of times than any others of the plurality of users; and
- assigning the first user as the primary user of the network component.

11. The computer program product of claim 10, wherein identifying the plurality of users comprises identifying a set of users associated with login credentials that were entered during the predetermined period of time.

12. The computer program product of claim 10, wherein identifying the plurality of users comprises identifying a set of users that own a plurality of separate devices that communicated with the network component during the predetermined period of time.

13. The computer program product of claim 9, wherein the computer readable instructions further comprise instructions for:
- identifying vulnerability information for the vulnerability of the network component comprising at least a vulnerability classification, a remediation deadline, and a lifecycle of the vulnerability,
- wherein the notification of the vulnerability includes the vulnerability information.

14. The computer program product of claim 13, wherein identifying the vulnerability information for the vulnerability of the network component comprises comparing the vulnerability to a vulnerability database to identify the vulnerability classification, the remediation deadline, and the lifecycle of the vulnerability.

15. The computer program product of claim 9, wherein the computer readable instructions further comprise instructions for:
- determining whether a remediation procedure has been initiated; and
- when the remediation procedure has not been initiated, transmitting a second notification to the computing device of the primary user; or
- when the remediation procedure has not been initiated, transmitting a request to the computing device of the primary for confirmation that the remediation procedure will be completed by a remediation deadline.

16. The computer program product of claim 9, wherein the computing device of the primary user is not the network component.

17. A computer implemented method for network component owner identification and communication triggering, said computer implemented method comprising:
- providing a computing system comprising a computer processing device and a non-transitory computer readable medium, where the computer readable medium comprises configured computer program instruction code, such that when said instruction code is operated by said computer processing device, said computer processing device performs the following operations:
- monitoring a plurality of systems of record associated with a network of devices;
- identifying, from the monitored plurality of systems of record, a primary user of a network component, wherein identifying the primary user of the network component comprises determining a correlation value between the network component and a user associated with the network component, wherein the correlation value is based on ownership correlation criteria of (i) administrator-type actions taken on the network component, (ii) high frequency of accessing the network component, (iii) high duration of accessing the network component, and (iv) a lack of other users that are associated with the network component;
- recording a linkage between the primary user, communication information for the primary user, and the network component in an ownership database;
- determining that a vulnerability of the network component is occurring; and
- in response to determining that the vulnerability of the network component is occurring, automatically transmitting a notification of the vulnerability to a computing device of the primary user.

18. The computer implemented method of claim 17, wherein identifying the primary user of the network component comprises:
- determining that the primary user cannot be identified in a primary system of record;
- determining that the primary user cannot be identified in secondary systems of record;
- analyzing network traffic to the network component to identify a plurality of users that have accessed the network component during a predetermined period of time;
- identifying, from the plurality of users, a first user that either (i) most recently accessed the network component or (ii) accessed the network component a greater number of times than any others of the plurality of users; and
- assigning the first user as the primary user of the network component.

* * * * *